United States Patent
Beyer et al.

(10) Patent No.: US 7,457,374 B2
(45) Date of Patent: Nov. 25, 2008

(54) DC OFFSET CANCELLATION FOR WLAN COMMUNICATION DEVICES

(75) Inventors: Sascha Beyer, Ottendorf-Okrilla (DE); Matthias Lange, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 792 days.

(21) Appl. No.: 10/970,238

(22) Filed: Oct. 21, 2004

(65) Prior Publication Data
US 2005/0243953 A1    Nov. 3, 2005

(30) Foreign Application Priority Data
Apr. 30, 2004  (DE) ................ 10 2004 021 225

(51) Int. Cl.
H04L 25/06 (2006.01)
H04L 25/10 (2006.01)

(52) U.S. Cl. .................................. 375/319
(58) Field of Classification Search .......... 375/319
See application file for complete search history.

(56) References Cited

U.S. PATENT DOCUMENTS 5,584,059 A * 12/1996 Turney et al. ............... 455/126
7,302,022 B2 * 11/2007 Kim et al. .................... 375/345
2003/0128776 A1 * 7/2003 Rawlins et al. ............... 375/319
2003/0203728 A1 * 10/2003 Filipovic .................. 455/234.2
2004/0202102 A1 * 10/2004 Kim et al. .................... 370/208
2004/0247046 A1 * 12/2004 Hsiao ........................ 375/319
2005/0009494 A1 * 1/2005 Sorrells et al. ............... 455/313
2005/0245217 A1 * 11/2005 Dantoni et al. .............. 455/139

* cited by examiner

*Primary Examiner*—David C. Payne
*Assistant Examiner*—Nader Bolourchi
(74) *Attorney, Agent, or Firm*—Meyertons Hood Kivlin Kowert & Goetzel, P.C.

(57) ABSTRACT

A method of transmitting information in a WLAN (Wireless Local Area Network) network and corresponding WLAN communication devices and integrated circuit chips are provided. A correction signal is used for compensating for a dc offset in a data signal containing at least part of the information to be transmitted. The correction signal is varied by making it taking different values. For each of the different values, a strength of an indicator signal indicative of the dc offset is determined. Based upon the determined strength, an optimum value of the correction signal is identified at which the dc offset is minimized. The value of the correction signal is set to the optimum value. Further, a method of transmitting information in a WLAN network is provided, including compensating for a first and second dc offset in a first and second data signal, respectively, using a first and second feedback loop, respectively.

59 Claims, 7 Drawing Sheets

DC OFFSET CANCELLATION FOR WLAN COMMUNICATION DEVICES

BACKGROUND OF THE INVENTION

1. Field of the Invention

The present application relates to a method of transmitting information in a WLAN (Wireless Local Area Network) network and corresponding WLAN communication devices and integrated circuit chips, and in particular to minimizing DC offsets therein.

2. Description of the Related Art

A wireless local area network is a flexible data communication system implemented as an extension to or as an alternative for a wired LAN. Using radio frequency or infrared technology, WLAN systems transmit and receive data over the air, minimizing the need for wired connections. Thus, WLAN systems combine data connectivity with user mobility.

Today, most WLAN systems use spread spectrum technology, a wideband radio frequency technique developed for use in reliable and secure communication systems. The spread spectrum technology is designed to trade off bandwidth efficiency for reliability, integrity and security. Two types of spread spectrum radio systems are frequently used: frequency hopping and direct sequence systems.

The standard defining and governing WLAN networks that operate in the 2.4 GHz spectrum is the IEEE 802.11 standard. To allow higher data rate transmissions, the standard was extended to 802.11g and 802.11a which allow data rates of 54 Mbps in the 2.4 GHz and 5 GHz spectrum, respectively. Further extensions exist.

With the growing demand for WLAN systems in the consumer market, product costs and quality have become key factors in the development of WLAN communication devices, i.e. transmitters, receivers or transceivers. Therefore, the low-IF (low-Intermediate Frequency) topology offering the prospect of integrating the RF (Radio Frequency) or IR (Infrared) front-end on-chip for reducing the production costs while providing a high operational performance has become a frequently used design for such WLAN communication devices. In a low-IF WLAN communication device operating in a reception mode, an incoming transmission signal received over a wireless communication medium, i.e. the air, is down-converted from its RF or IR carrier to an intermediate frequency of typically several hundred kHz by mixing it with an LO (Local Oscillator) signal having an accordingly selected frequency. The low-IF signal thus generated can be demodulated on this intermediate frequency or can be further down-converted to baseband after further processing, e.g., filtering.

The intermediate frequency created by the mixer is defined as the absolute value of the difference between the carrier frequency and the LO frequency. However, since the mixer does not recognize the polarity of the frequency difference between the carrier and the LO signal, down-conversion of two different received frequencies to the same intermediate frequency occurs. Apart from the wanted signal, an unwanted signal at a frequency, often referred to as the image frequency, is down-converted to the intermediate frequency.

In order to suppress the signal at the image frequency, i.e. to perform image rejection, the analytic transmission signal is converted to complex low-IF signals which are then filtered using active complex filters. In a complex filter, the filtering of positive frequencies is different from the filtering of negative frequencies. Since every frequency component of a complex signal can be written as a sum of two sequences, the first sequence having only a positive frequency component, the second only a negative, complex filters allow for eliminating the image signal in those cases where the image signal is situated on the opposite frequencies of the wanted signal.

A typical design for an RF (IR) front-end of a low-IF WLAN transceiver is shown in FIG. 1. For clarity reasons, only the signal flow in the transmission mode of the low-IF WLAN transceiver has been depicted. When the low-IF WLAN transceiver is in the reception mode, the signal flow (except for the LO signals) takes the opposite direction.

In detail, when in the reception mode, a transmission signal is provided to a complex mixer 160 for being down-converted to complex low-IF signals by being complex-mixed with the complex signals of a local oscillator 150: an LO I (In-phase) signal and an LO Q (Quadrature-phase) signal. The I- and Q-signals resulting from the complex mixer 160 are further processed in an I-path 110 and Q-path 140, respectively. This may include, e.g., amplification, filtering, or further down-conversion. Part of the I-signal resulting from the complex mixer 160 is separated before the I-path 110 is entered, complex-filtered in an active complex filter 120, and added to the Q-signal leaving the Q-path 140. Accordingly, part of the Q-signal resulting from the complex mixer 160 is split, complex-filtered in the active complex filter 130, and added to the I-signal leaving the I-path 110.

When the low-IF WLAN transceiver operates in the transmission mode, an input I-signal and an input Q-signal are provided to the I-path 110 and the Q-path 140, respectively. The signal processing in the I-path 110 and the Q-path 140 may include, e.g., amplification, filtering or up-conversion from baseband to the intermediate frequency. Part of the input I-signal (input Q-signal) is split before the I-path 110 (Q-path 140) is entered, complex-filtered in the active complex filter 130 (120), and added to the Q-signal leaving the Q-path 140 (I-signal leaving the I-path 110) to generate the combined Q-signal (combined I-signal). Subsequently, the combined I-signal and the combined Q-signal are provided to the complex mixer 160 for up-conversion to a desired transmission frequency by being complex-mixed with the LO I-signal and LO Q-signal generated by the local oscillator 150.

Complex operators like the complex filters 120, 130 and the complex mixer 160 are usually made with pairs of real operators, amplifiers, mixers and filters. The performance of the system in which these complex operators are used degrades when they are not perfectly matched. In analog integrated implementations, hence in low-IF WLAN transceivers, mismatch is unavoidable. In particular, the active complex filters 120, 130 cause the combined I-signal and combined Q-signal to suffer from a DC (Direct Current) offset when the low-IF WLAN transceiver is operating in the transmission mode. At the complex mixer 160, the DC offset causes an LO feedthrough, i.e. the transmission signal having a component at the LO frequency.

In circumstances where only frequencies within a certain frequency mask are to be used for the transmission signals of a WLAN system, the LO feedthrough can cause the transmission signal to have a component outside the allowed frequency mask. Thus, conventional low-IF WLAN transceivers often have the disadvantage of causing illegal spurious emissions.

Further, the LO feedthrough causes the transmission signal to have a higher overall signal level. This can imply that the signal level is located beyond the range of linear operation of amplifiers used for amplifying the transmission signal. This leads to degradation of the amplification efficiency. In consequence, many prior art low-IF WLAN transceivers suffer from the problem of achieving only insufficient intensity of the transmission signal at the desired transmission frequency.

In broadband systems, the carrier and LO bands of the transmission signal often happen to overlap each other since they are spaced only by the low intermediate frequency. Thus, the LO leakage gives raise to interferences between the carrier and LO bands of the transmission signal. Therefore, conventional low-IF WLAN transceivers also have the disadvantage of usually suffering from considerable deterioration of the transmission quality.

SUMMARY OF THE INVENTION

An improved method of transmitting information in a WLAN network and corresponding WLAN communication devices and integrated circuit chips are provided that may overcome the disadvantages of the conventional approaches. In particular, embodiments allow for preventing spurious emissions at the LO frequency. Other embodiments offer the advantage of enhanced amplification efficiency of the transmission signal. In further embodiments, interferences between the carrier and LO bands of the transmission signal are avoided and thus the transmission signal quality is increased.

In one embodiment, a method of transmitting information in a WLAN network is provided. A correction signal is used for compensating for a DC offset in a data signal containing at least part of the information to be transmitted. The correction signal is varied by making the correction signal taking different values. For each of the different values of the correction signal, a strength of an indicator signal indicative of the DC offset is determined. Based upon the determined strength of the indicator signal, an optimum value of the correction signal is identified at which the DC offset is minimized. The value of the correction signal is set to the optimum value.

In another embodiment, a method of transmitting information in a WLAN network is provided comprising compensating for a first DC offset in a first data signal containing at least a first part of the information to be transmitted using a first correction signal. The method further comprises compensating for a second DC offset in a second data signal containing at least a second part of the information to be transmitted using a second correction signal. The first correction signal is tuned based upon a first indicator signal indicative of the first DC offset using a first feedback loop. The second correction signal is tuned based upon a second indicator signal indicative of the second DC offset using a second feedback loop.

In a further embodiment, a WLAN communication device for transmitting information in a WLAN network comprising a compensator unit, a control unit, an analyzer unit and an identifier unit is provided. The compensator unit is arranged to compensate for a DC offset in a data signal containing at least part of the information to be transmitted using a correction signal. The control unit is arranged to vary the correction signal by making the correction signal taking different values, and to set the value of the correction signal to an optimum value at which the DC offset is minimized. The analyzer unit is arranged to determine for each of the different values of the correction signal a strength of an indicator signal indicative of the DC offset. The identifier unit is arranged to identify, based upon the determined strength of the indicator signal, the optimum value of the correction signal.

In yet another embodiment, a WLAN communication device for transmitting information in a WLAN network comprising a first compensator unit, a second compensator unit, a first feedback loop and a second feedback loop is provided. The first compensator unit is arranged to compensate for a first DC offset in a first data signal containing at least a first part of the information to be transmitted using a first correction signal. The second compensator unit is arranged to compensate for a second DC offset in a second data signal containing at least a second part of the information to be transmitted using a second correction signal. The first feedback loop is arranged to tune the first correction signal based upon a first indicator signal indicative of the first DC offset. The second feedback loop is arranged to tune the second correction signal based upon a second indicator signal indicative of the second DC offset.

In still another embodiment, an integrated circuit chip for transmitting information in a WLAN network comprising a compensator circuit, a control circuit, an analyzer circuit and an identifier circuit is provided. The compensator circuit is for compensating for a DC offset in a data signal containing at least part of the information to be transmitted using a correction signal. The control circuit is for varying the correction signal by making the correction signal taking different values, and for setting the value of the correction signal to an optimum value at which the DC offset is minimized. The analyzer circuit is for determining for each of the different values of the correction signal a strength of an indicator signal indicative of the DC offset. The identifier circuit is for identifying, based upon the determined strength of the indicator signal, the optimum value of the correction signal.

In a further embodiment, an integrated circuit chip for transmitting information in a WLAN network comprising a first compensator circuit, a second compensator circuit, a first feedback loop circuit and a second feedback loop circuit is provided. The first compensator circuit is for compensating for a first DC offset in a first data signal containing at least a first part of the information to be transmitted using a first correction signal. The second compensator circuit is for compensating for a second DC offset in a second data signal containing at least a second part of the information to be transmitted using a second correction signal. The first feedback loop circuit is for tuning the first correction signal based upon a first indicator signal indicative of the first DC offset. The second feedback loop circuit is for tuning the second correction signal based upon a second indicator signal indicative of the second DC offset.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings, wherein like elements and structures are indicated by like reference numbers. While the embodiments that will be set forth in the following refer to low-IF WLAN transceivers, other embodiments may relate to other transceivers, transmitters or any type of signal processing devices suffering from DC offsets.

Figure 2A:
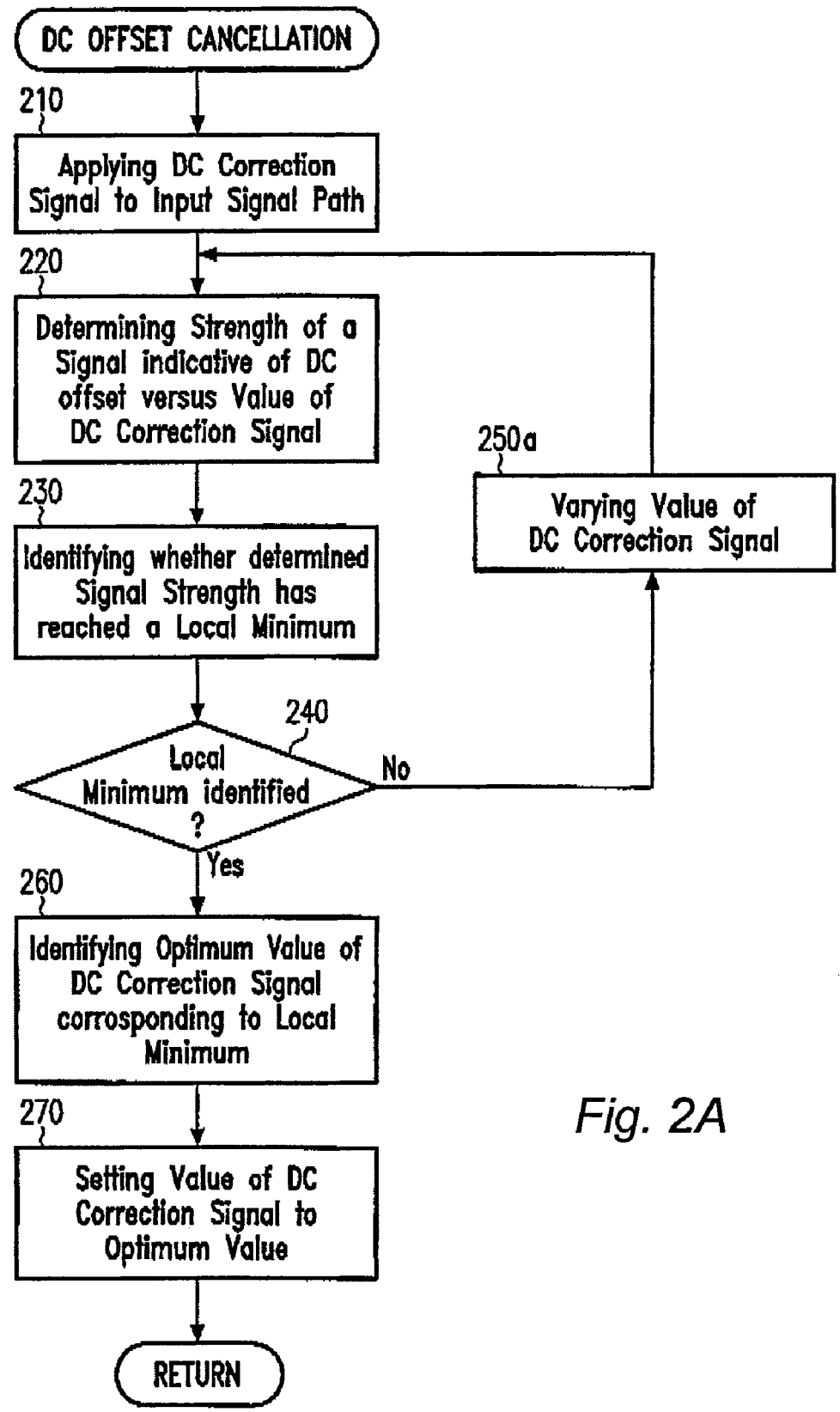
FIGS. 2a and 2b are flow diagrams illustrating a DC offset cancellation process according to a first embodiment and a second embodiment, respectively.

Referring now to FIG. 2a, a DC offset cancellation process according to an embodiment is shown. This process may allow for minimizing or even completely cancelling a DC offset imposed on a data signal. In step 210, a DC correction signal may be applied to the input signal path of a low-IF WLAN transceiver for compensating for a DC offset imposed on the input signal. In this context, the meaning of "compensating" may also include partially compensating. Further, the term "DC correction signal" may indicate that the respective signal is for compensating for, i.e. correcting, the DC offset. The DC correction signal may be a DC signal, e.g., a DC current and/or voltage, but other types of signals may also be used for compensating for the DC offset.

In step 220, the strength of an indicator signal indicative of the DC offset may be determined versus the value of the DC correction signal. The determination of the indicator signal strength may include measuring the amplitude of the indicator signal. The amplitude can have both positive and negative values. Further, the determination may comprise squaring the measured amplitude of the indicator signal and/or calculating the absolute value thereof. If more than one indicator signal is used, the amplitude of each of the indicator signals may be measured. The measured amplitudes may be squared and/or added.

In step 230, it is identified whether the signal strength determined in step 220 comprises a local minimum. According to the present embodiment, the presence of a local minimum is identified by comparing the determined strengths of the indicator signal and detecting whether there is a determined strength inferior to both its left-hand and right-hand neighboring strength. The left-hand (right-hand) neighboring strength may be defined as the strength of the indicator signal determined for the next lower (next higher) value of the DC correction signal. In the present embodiment, the indicator signal is selected such that the local minimum of the determined strengths corresponds to a value of the DC correction signal at which the DC offset is minimized. This value will be referred to in the following as the optimum value of the DC correction signal.

In another embodiment, the identifying step 230 comprises, for each of the determined strengths having a left-hand neighboring strength and a right-hand neighboring strength, calculating a first difference between the determined strength and its left-hand neighboring strength and a second difference between the right-hand neighboring strength and the determined strength. Subsequently, it may be determined whether the determined strengths of the indicator signal comprise a local minimum for which the first difference and the second difference have different signs.

In a further embodiment, step 230 of identifying whether the determined strengths comprise a local minimum may include interpolating between the determined strengths for generating a smooth strength function. For instance, polynomial spline functions may be used for obtaining the smooth strength function. The first derivative of the smooth strength function may be calculated, and it may be determined whether the first derivative comprises a null. The determined strength or interpolated strength corresponding to the null of the first derivative may be identified as the local minimum.

In step 240, it may be queried whether the local minimum corresponding to a minimized DC offset has been identified in step 230. If this is not the case, the value of the DC correction signal may be varied in step 250a.

According to the present embodiment, the value of the DC correction signal is set to a start value when step 210 of applying the DC correction signal to the input signal path is performed. Each time step 250a, is executed, the value of the DC correction signal may be increased or decreased by a certain step value until a target value is reached. If no local minimum has been identified for the values of the DC correction signal between the start value and the target value, steps 220 to 250a may be repeated for other start values, target values and/or step values.

Figure 2B:
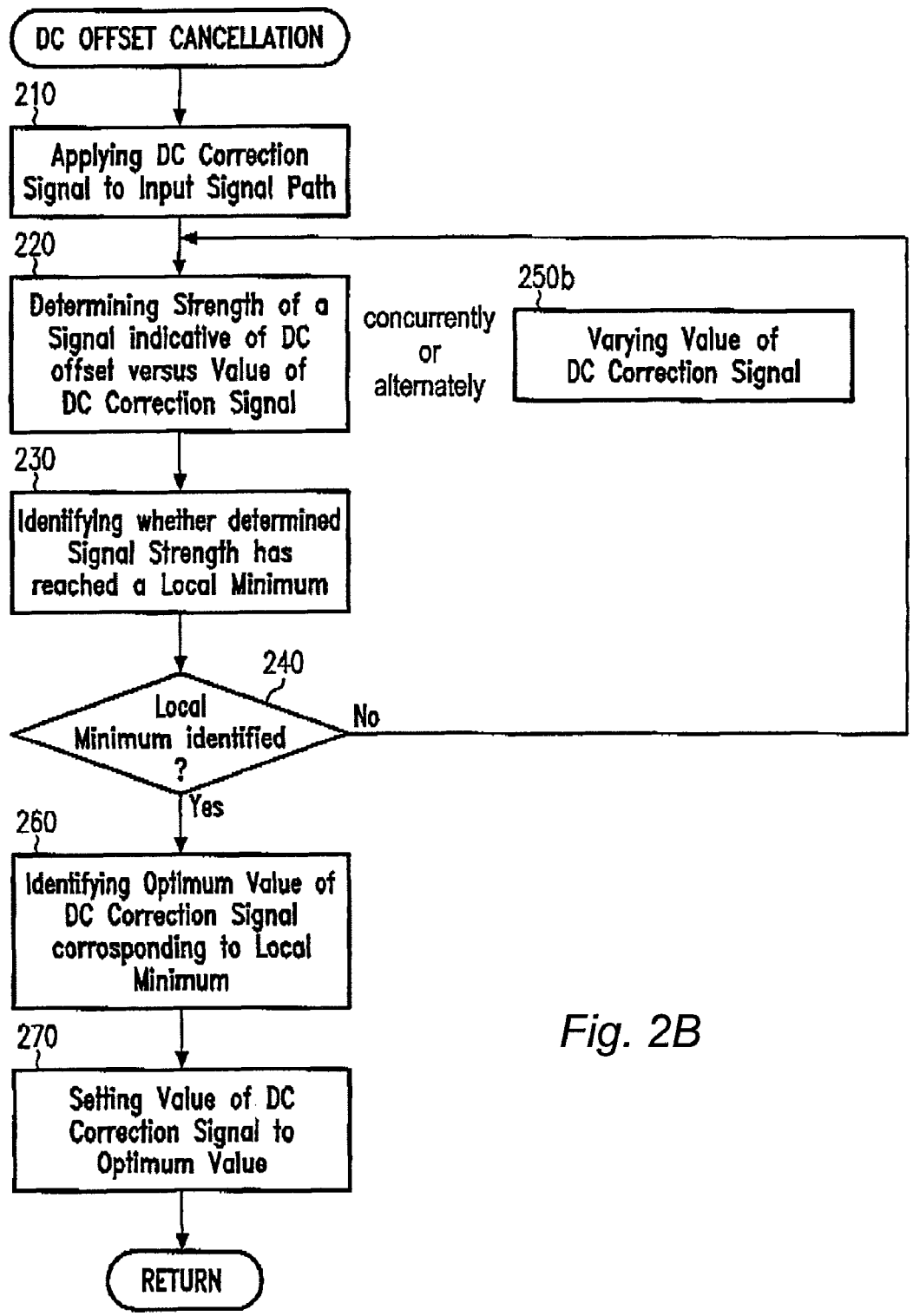

In another embodiment, as illustrated in FIG. 2b, step 250b of varying the value of the DC correction signal comprises continuously increasing or decreasing the value of the DC correction signal, and step 220 of determining the strength of the indicator signal is performed continuously while the value of the DC correction signal is varied. In other words, steps 220 and 250 may be performed concurrently. In this embodiment, step 220 results in a continuous function of the strength of the indicator signal against the value of the DC correction signal. Accordingly, step 230 may comprise calculating the first derivative of the strength function, determining whether the first derivative comprises a null and identifying the determined strength corresponding to the null of the first derivative as the local minimum.

Once step 240 yields that the determined signal strengths comprise a local minimum, the optimum value of the DC correction signal may be identified in step 260 as the value of the DC correction signal corresponding to the local minimum of the strength of the indicator signal. Finally, in step 270, the value of the DC correction signal may be set to the optimum value.

It is noted that the sequences of steps shown in FIGS. 2a and 2b have been chosen for illustration purposes only and is not to be understood as limiting the invention. For instance, steps 250b and 220 of FIG. 2b may be performed alternately until the target value of the DC correction signal is reached, and afterwards step 230 of identifying whether the determined signal strengths comprise a local minimum may be performed. It is further noted that steps 260 and 270 are substantially the same for the various embodiments described with reference to FIG. 2a and FIG. 2b.

In the present embodiment, the determined strength of the indicator signal reaches a local extremum, particularly a local minimum, only if the DC offset is minimized. In other embodiments, the determined strength of the indicator signal may have a local maximum when the DC correction signal is minimized or may include a plurality of local extrema. In such circumstances, step 230 may comprise verifying whether further criteria are fulfilled in order to identify whether the determined strength comprises a local extremum that corresponds to a minimized DC offset. For example, when a continuous strength function is used, a second derivative of the strength function may be calculated and it may be determined whether the second derivative corresponding to the null of the first derivative is positive or negative in order to determine whether the local extremum identified by the null of the first derivative is a local minimum or a local maximum, respectively.

Figure 3:
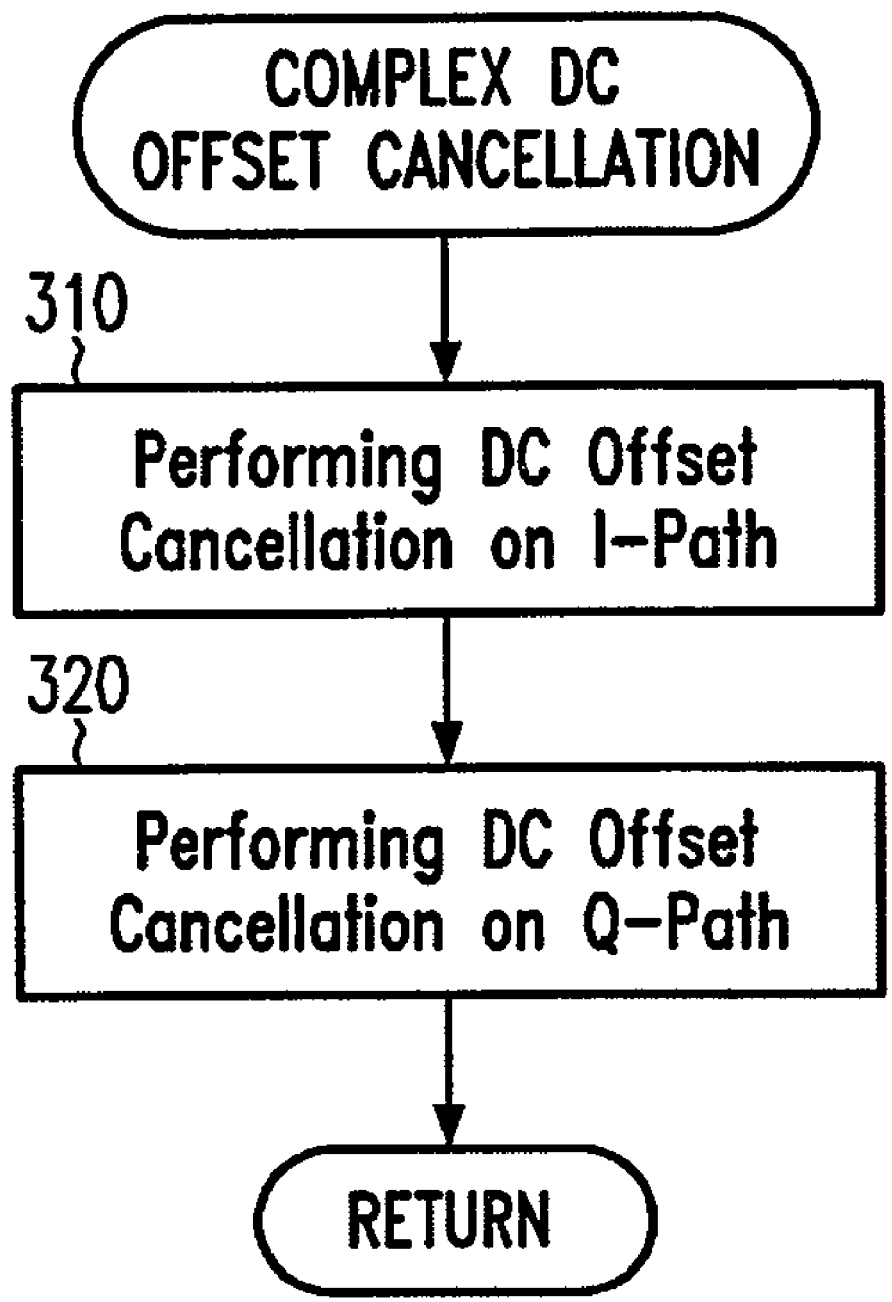
FIG. 3 is a flow diagram illustrating a complex DC offset cancellation process according to an embodiment.

Turning now to FIG. 3, a flow diagram illustrating a complex DC offset cancellation process is shown. The complex DC offset cancellation may be employed in systems where DC offsets imposed on a plurality of signals are to be minimized. The complex DC offset cancellation may even be used for minimizing DC offsets residing on cross-coupled signals.

In step 310, the DC offset cancellation described above with reference to FIG. 2 may be applied to a first signal suffering from a first DC offset. In the depicted embodiment, the DC offset cancellation is applied to an I-signal in a system where complex I- and Q-signals are used. Once the optimum value of the first DC correction signal applied to the I-signal has been identified in step 260, the value of the first DC correction signal is set to this optimum value in step 270 and is kept at this value while step 320 is performed. In step 320, the DC offset cancellation according to the process illustrated in FIG. 2 is performed anew for identifying an optimum value of a second DC correction signal applied to the Q-signal and setting the value of the second DC correction signal to this optimum value.

According to the present embodiment, it is not necessary to switch off the remaining signals carrying DC offsets while the DC offset on one signal is minimized, even when the respective signals are cross-coupled. In particular, it may be unnecessary to switch off the Q-signal (I-signal) while step 310 (320) of performing the DC offset cancellation on the I-signal (Q-signal) is executed.

It is noted that steps 310 and 320 may also be performed in the inverse order. The sequence of steps 310 and 320 may be supplemented with corresponding further steps of performing the DC offset cancellation when DC offsets on more than two signals are to be minimized. The same or different indicator signals may be used for minimizing DC offsets on a plurality of signals.

Figure 1:
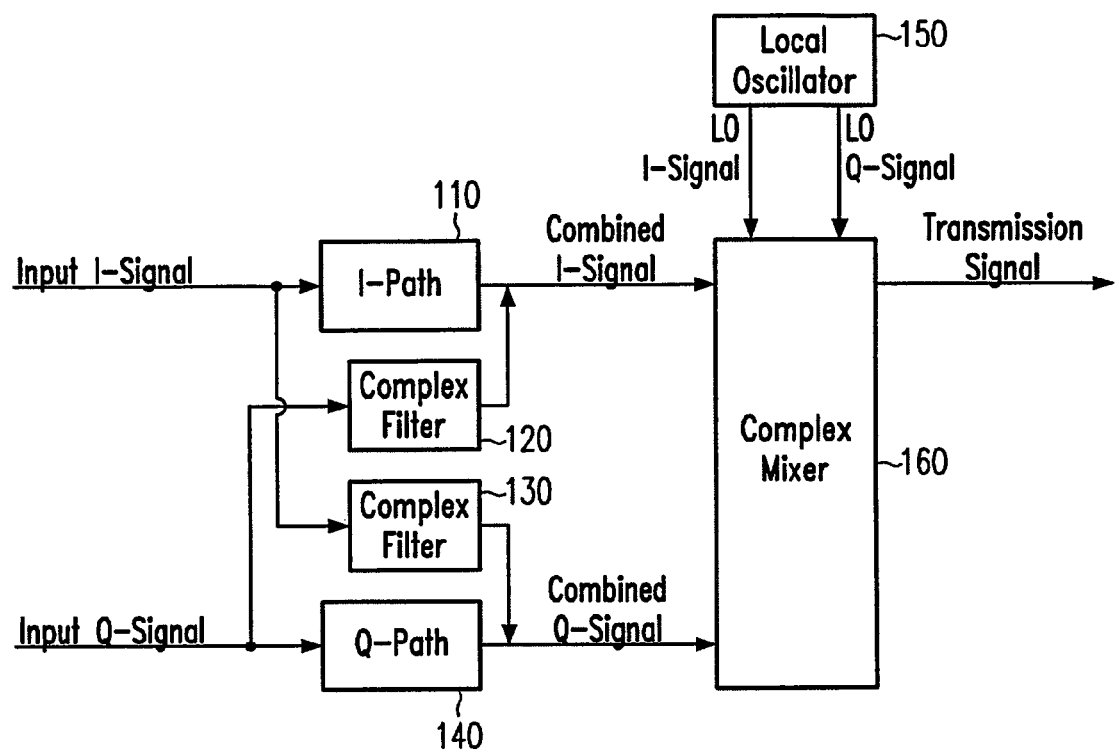
FIG. 1 is a block diagram illustrating components of a low-IF WLAN transceiver according to prior art.
Figure 4:
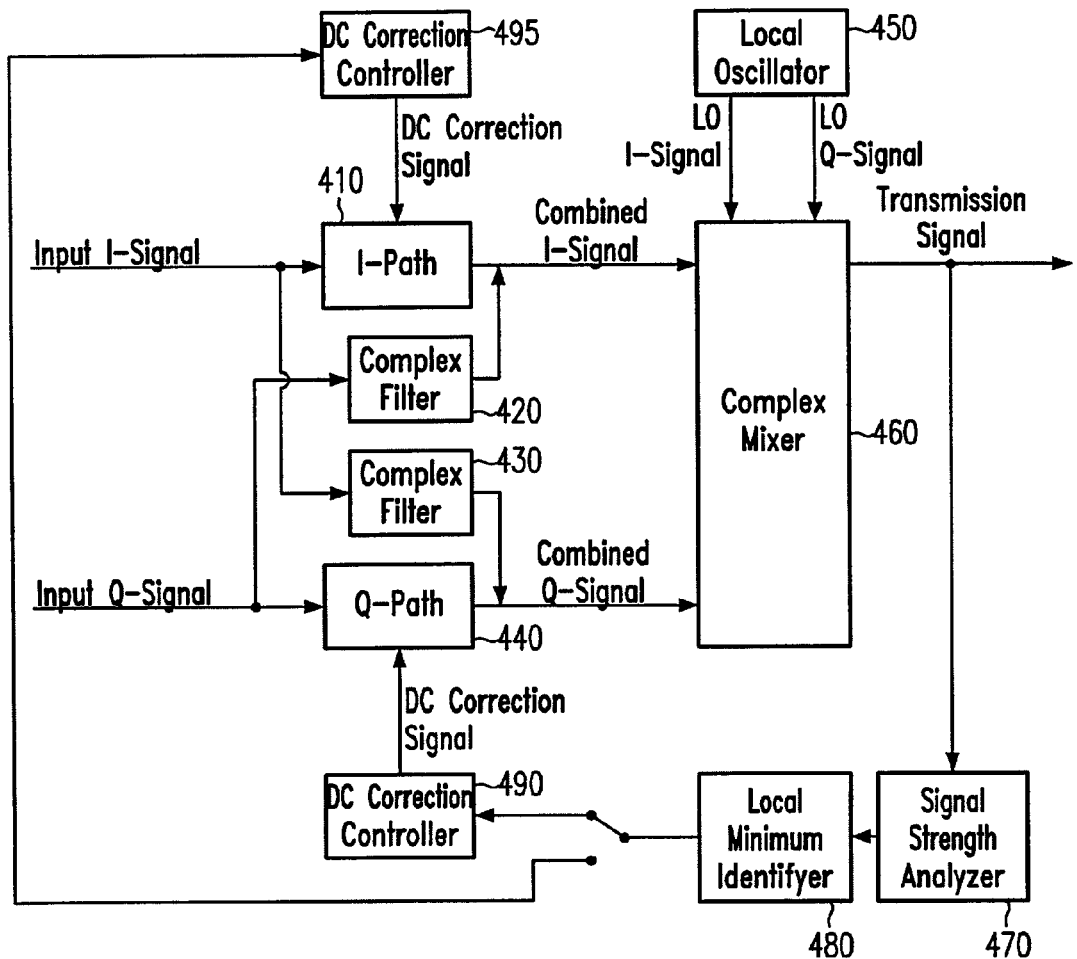
FIG. 4 is a block diagram illustrating components of a low-IF WLAN transceiver according to an embodiment.

In FIG. 4, components of a low-IF WLAN transceiver according to an embodiment are shown. The low-IF WLAN transceiver may be arranged for minimizing or even completely cancelling DC offsets residing on the combined I-signal and/or the combined Q-signal which may be caused by the active complex filters 420, 430 based upon the complex DC offset cancellation process illustrated in FIG. 3. The components 410 to 460 may correspond to the components 110 to 160 described above with reference to FIG. 1. DC correction controllers 490, 495 may be used for applying DC correction signals to the Q-path 440 and the I-path 410, respectively, in step 210, varying the value of each of the DC correction signals in step 250, and setting the value of each of the DC correction signals to an optimum value in step 270. In other embodiments, at least one of the DC correction signals may be applied at any other point between the I-path 410 (or the Q-path 440, respectively) and the complex mixer 460.

A switch between the DC correction controllers 490, 495 and the local minimum identifier 480 may be used for connecting either the DC correction controller 490 operating on the Q-path 440 or the DC correction controller 495 operating on the I-path 410 to the local minimum identifier 480, thereby allowing for completing the DC offset cancellation on one of the signals before the DC offset cancellation on the other signal is started according to FIG. 3. The switch may be controlled, e.g., by the local minimum identifier 480 or a separate switch control unit.

In the depicted embodiment, the transmission signal is used for the indicator signal. The strength of the indicator signal may be determined by a signal strength analyzer 470. In particular, the signal strength analyzer may determine the strength of the LO feedthrough, i.e. the strength of a component of the transmission signal at the LO frequency. For this purpose, the signal strength analyzer 470 may comprise a means for measuring the amplitude of the LO feedthrough. Further, the signal strength analyzer 470 may comprise means for squaring and/or calculating the absolute value of the measured amplitude.

The determined strength of the indicator signal may be provided to a local minimum identifier 480. The local minimum identifier 480 may be arranged for associating each of the determined strengths with the corresponding value of the DC correction signal applied to the I-path 410 or the Q-path 440 in order to determine the strengths of the indicator signal versus the values of the DC correction signal according to step 220. For this purpose, the local minimum identifier 480 may not only receive the determined strengths from the signal strength analyzer 470 but also the corresponding value of the DC correction signal from the DC correction controllers 490, 495. Alternatively, the local minimum identifier 480 may send control signals to the DC correction controllers 490, 495 to make the DC correction controllers 490, 495 apply DC correction signals having values predefined by the local minimum identifier 480. The sub-step of associating the determined strengths with the values of the DC correction signal may alternatively be performed by the signal strength analyzer 470 or a separate associating unit. Other methods for associating the determined strengths with the corresponding values of the DC correction signal may be applied.

The local minimum identifier 480 may further be employed for identifying in step 230 whether the determined strengths of the indicator signal comprise a local minimum. Therefore, the local minimum identifier 480 may comprise means for comparing the determined strengths, means for calculating differences between neighboring determined strengths, means for interpolating between the determined strengths of the indicator signal and/or means for calculating derivatives of an indicator signal strength function. Upon having found in step 240 that the determined strengths comprise a local minimum, the local minimum identifier 480 may identify in step 260 an optimum value of the DC correction signal corresponding to the local minimum of the determined strengths. Thereupon, the local minimum identifier 480 may communicate the optimum value to the DC correction controller 490 or the DC correction controller 495 so that the respective DC correction controller can set the value of the DC correction signal to the optimum value according to step 270.

Figure 5:
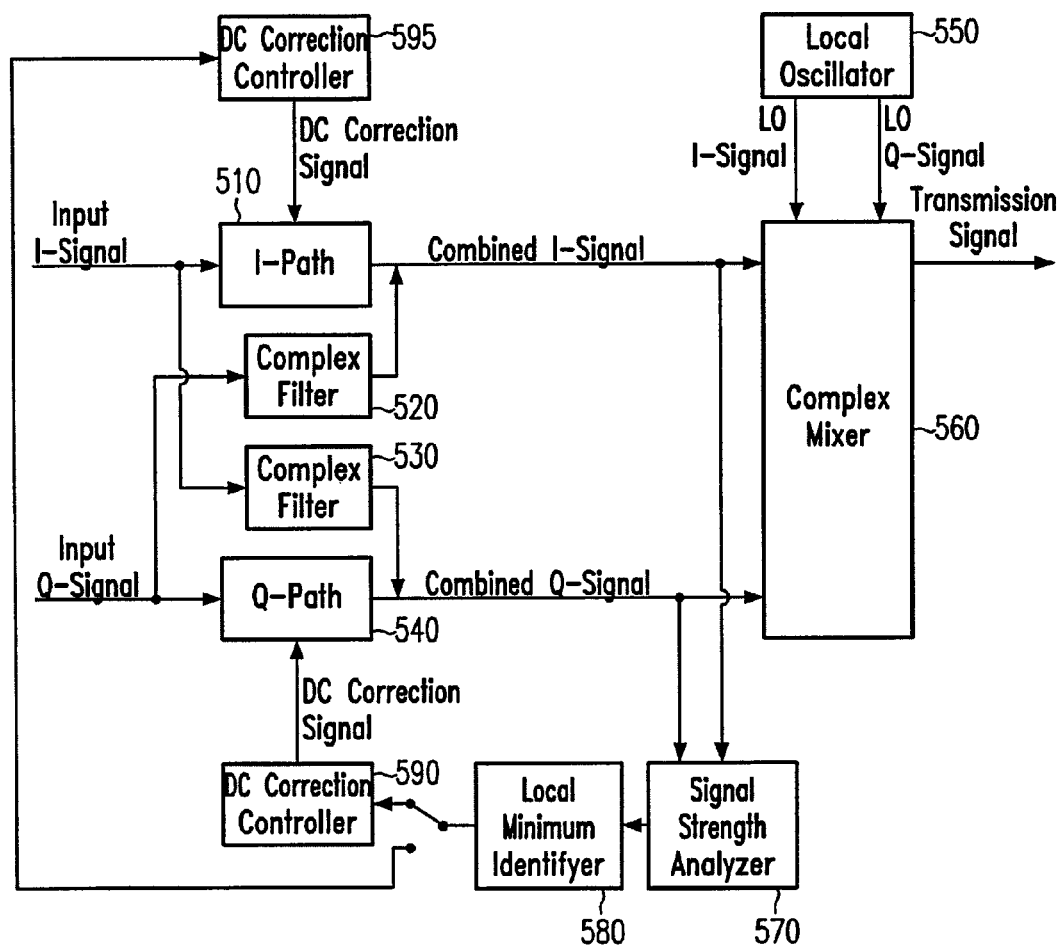
FIG. 5 is a block diagram illustrating components of a low-IF WLAN transceiver according to another embodiment.

Referring now to FIG. 5, components of a low-IF WLAN transceiver according to another embodiment are shown. The low-IF WLAN transceiver may be adapted to perform the complex DC offset cancellation process shown in FIG. 3 in order to minimize or completely cancel DC offsets imposed on the combined I-signal and/or the combined Q-signal. The components 510 to 560 may correspond to the components 110 to 160 described with reference to FIG. 1. The components 580 to 595 of the low-IF WLAN transceiver may correspond to the components 480 to 495 discussed with respect to FIG. 4.

The determination of the strength of the indicator signal in step 220 may be performed based on the combined I-signal and the combined Q-signal. The signal strength analyzer 570 may comprise means for measuring the amplitudes of the combined I-signal and the combined Q-signal. Further, the signal strength analyzer 570 may comprise means for squaring the measured amplitudes, for adding the squared measured amplitudes, and for using the result of the addition as the indicator signal. Further, the signal strength analyzer 570 and/or the local minimum identifier 580 may be arranged for associating the strengths of the indicator signal thus determined with the corresponding values of the DC correction signal according to the method described above with reference to FIG. 4.

In further embodiments, WLAN communication devices or integrated circuit chips may be provided, that are arranged for performing the above described methods and processes.

Figure 6:
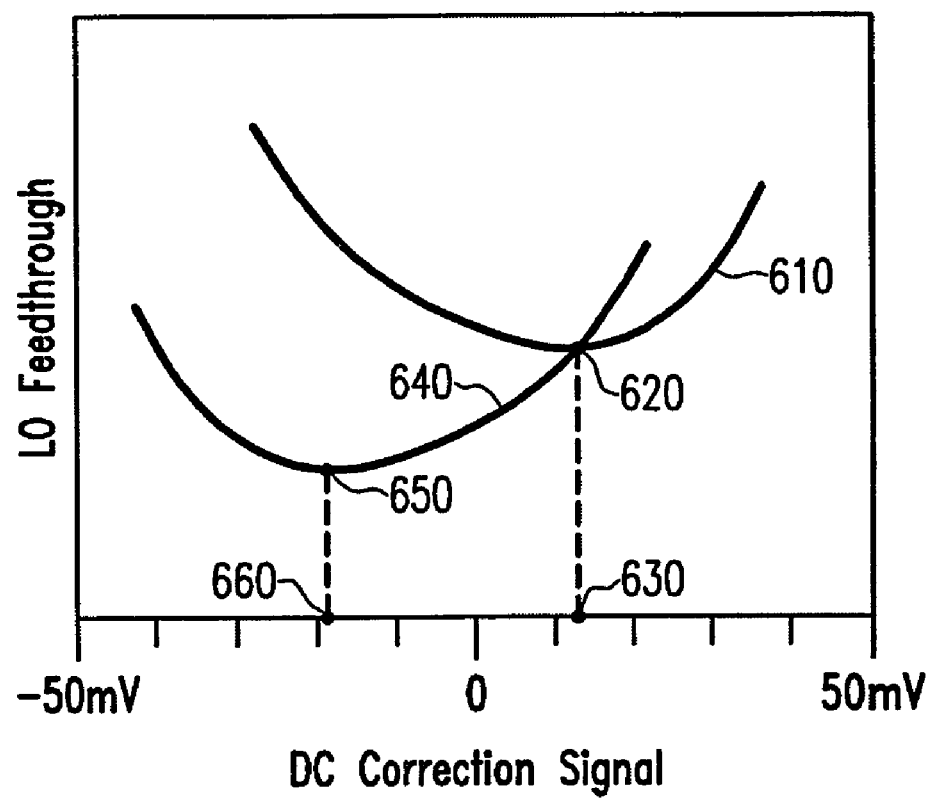
FIG. 6 illustrates the behavior of the LO feedthrough versus the DC correction signal according to an embodiment.

In FIG. 6, the behavior of the indicator signal versus the value of the DC correction signal according to an embodiment, e.g., in the low-IF WLAN transceiver described with respect to FIG. 4, is shown. In this embodiment, the LO feedthrough is used for the indicator signal. The strength function 610 may represent the behavior of the determined strength of the indicator signal when the value of a first DC correction signal, e.g., the DC correction signal applied to the I-path 410, is varied. The first local minimum 620 may be reached when the DC offset on a first signal, e.g., the combined I-signal, is minimized. The value 630 of the DC correction signal corresponding to the first local minimum 620 may be selected as the optimum value for the first DC correction signal.

Once a first local minimum 620 for the first path, e.g., the I-path, has been found, the process for the second path, e.g., the Q-path, may be started. The value of the first DC correction signal may be kept at the optimum value 630, and the strength of the indicator signal may pass along the curve 640 while the value of the second DC correction signal, e.g., the DC correction signal applied to the Q-path 440, may be varied. When the DC offset residing on a second signal, e.g., the combined Q-signal, is minimized, the strength of the indicator signal may reach the second local minimum 650. The optimum value of the second DC correction signal may correspond to the value 660 at which the second local minimum 650 is reached. Thus, when setting the values of the first and second DC correction signals to the optimum values 630, 660, both the DC offsets on the first and on the second signal may be minimized.

As apparent from the above description of embodiments, methods and corresponding devices for performing DC offset cancellation are provided. In a low-IF WLAN transceiver, I/Q-signals may be generated out of an analytic signal to perform image rejection. Active complex cross-coupled filters 120, 130, 420, 430, 520, 530 may be used to generate these complex signals. Active parts may suffer from DC offset which may cause LO feedthrough in a transmitter. The method according to the presented embodiments may reduce this DC offset for a complex cross-coupled structure.

The presented DC offset cancellation may be applied in combination with AMD's Am1780 WLAN transceiver.

As discussed above, a DC offset at either the combined I-signal or the combined Q-signal depicted in FIGS. 4 and 5 or at both the combined I-signal and the combined Q-signal may generate an LO feedthrough at the transmission signal. In one embodiment, the amplitude of the LO may be measured and fed into the local minimum identifier 480. As a first step to reduce the DC offset causing the LO feedthrough, a DC voltage may be injected with the DC correction controller 495 to reduce the overall LO feedthrough. This may be accomplished such that a current is injected starting at a certain level and increased by a certain step. The local minimum identifier 480 may be used to find a first minimum 620.

When the minimum 620 is found for the I-path 410, the same process may be started for the Q-path 440 using the local minimum identifier 480 and the DC correction controller 490. A second local minimum 650 may then be found. Both I and Q correction values may be selected now that a local minimum 620, 650 or the maximum LO rejection, respectively, has been reached. It may not be required to switch either the Q- or the I-path off during calibration of the other path.

Additionally, another type of implementation has been presented. Instead of using the transmission signal to detect the LO leakage, the combined I-signal and the combined Q-signal may be used to determine the DC offset. The correction mechanism may be the same as in the embodiment where the transmission signal is used for the indicator signal. An advantage of this method may be the simplicity. It may not be required to switch paths off. Local minima 620, 650 may be used to find the maximum value for image rejection. Thus, a fast algorithm may be possible to find the total minimum.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A method of transmitting information in a WLAN (Wireless Local Area Network) network wherein DC offsets are minimized, comprising:
    applying a start value of a correction signal to a data signal containing at least part of the information to be transmitted;
    varying the correction signal;
    determining for each different value of the correction signals, a strength of an indicator signal indicative of a dc offset;
    identifying, based upon the determined strengths of the indicator signal, an optimum value of the correction signal at which the strength of the indicator signal is at a local extremum, wherein identifying the optimum values comprises one of (1) repeatedly varying the correction signal and determining the strength of the indicator signal until the local extremum is detected, (2) comparing determined strengths of the indicator signal with each other, (3) calculating indicator signal strength differences, (4) interpolating determined strengths of the indicator signal, and (5) calculating a derivative of determined strengths of the indicator signal; and
    setting the value of the correction signal to the identified optimum value.

2. The method of claim 1, wherein the strength of the indicator signal is positively or negatively correlated with the dc offset; and
    wherein the strength of the indicator signal reaches a local minimum or a local maximum, respectively, when the dc offset is minimized.

3. The method of claim 2, wherein the strength of the indicator signal reaches the local minimum or the local maximum, respectively, only when the dc offset is minimized.

4. The method of claim 3, wherein identifying the optimum value of the correction signal comprises:
    detecting whether the determined strengths comprise the local minimum or the local maximum, respectively; and
    selecting the value of the correction signal corresponding to the local minimum or the local maximum, respectively, as the optimum value.

5. The method of claim 4, further comprising repeatedly performing the following sequence of steps until the step of detecting whether the determined strengths comprise the local minimum or the local maximum, respectively, yields that the determined strengths comprise the local minimum or the local maximum, respectively:
  varying the correction signal by making the correction signal taking at least one further different value;
  determining the strength of the indicator signal for each of the further different values of the correction signal; and
  detecting whether the determined strengths determined for the different values and the at least one further different value of the correction signal comprise the local minimum or the local maximum, respectively.

6. The method of claim 4, wherein detecting whether the determined strengths comprise the local minimum or the local maximum, respectively, comprises:
  comparing the determined strengths of the indicator signal with each other;
  determining whether the determined strengths comprise an extremal strength lower or higher, respectively, than both its left-hand neighboring strength and its right-hand neighboring strength; and
  identifying the extremal strength as the local minimum or the local maximum, respectively;
  wherein the left-hand neighboring strength and the right-hand neighboring strength of each of the determined strengths corresponds to the strength determined for the closest lower or closest higher value of the correction signal, respectively, than the value of the correction signal for which said determined strength has been determined.

7. The method of claim 4, wherein detecting whether the determined strengths comprise the local minimum or the local maximum, respectively, comprises:
  for each of the determined strengths having a left-hand neighboring strength and a right-hand neighboring strength, calculating a first difference between said determined strength and its left-hand neighboring strength and a second difference between its right-hand neighboring strength and said determined strength;
  determining whether the determined strengths comprise an extremal strength for which the first difference and the second difference have different signs; and
  identifying the extremal strength as the local minimum or the local maximum, respectively;
  wherein the left-hand neighboring strength and the right-hand neighboring strength of each of the determined strengths corresponds to the strength determined for the closest lower or closest higher value of the correction signal, respectively, than the value of the correction signal for which said determined strength has been determined.

8. The method of claim 4, wherein detecting whether the determined strengths comprise the local minimum or the local maximum, respectively, comprises:
  for each of the determined strengths, interpolating between the determined strength and its neighboring strength for generating a smooth strength function;
  calculating a first derivative of the smooth strength function;
  determining whether the first derivative of the smooth strength function comprises a null; and
  identifying the determined strength or the interpolated strength corresponding to the null of the first derivative as the local minimum or the local maximum, respectively;
  wherein the neighboring strength of each of the determined strengths corresponds to the strength determined for the closest lower or closest higher value of the correction signal than the value of the correction signal for which said determined strength has been determined.

9. The method of claim 1, wherein varying the correction signal comprises:
  starting at a start value of the correction signal; and
  stepwise increasing or decreasing the value of the correction signal by a step value until a target value is reached.

10. The method of claim 4, wherein detecting whether the determined strengths comprise the local minimum or the local maximum, respectively, comprises:
  calculating a first derivative of the determined strengths against the different values of the correction signal;
  determining whether the first derivative comprises a null; and
  identifying the determined strength corresponding to the null of the first derivative as the local minimum or the local maximum, respectively.

11. The method of claim 1, wherein varying the correction signal comprises:
  starting at a start value of the correction signal; and
  continuously increasing or decreasing the value of the correction signal until a target value is reached.

12. The method of claim 1, further comprising mixing the data signal with a local oscillator signal for generating a transmission signal to be transmitted through a wireless communication medium of the WLAN network;
  wherein the local oscillator signal has a local oscillator frequency allowing for the transmission signal to have a first transmission signal component at a desired transmission frequency;
  wherein the transmission signal further has a second transmission signal component at the local oscillator frequency; and
  wherein the second transmission signal component is used for the indicator signal.

13. The method of claim 12, wherein determining the strength of the indicator signal comprises measuring an amplitude of the indicator signal.

14. The method of claim 13, wherein determining the strength of the indicator signal further comprises calculating the absolute value of the measured amplitude.

15. The method of claim 14, wherein calculating the absolute value of the measured amplitude comprises squaring the measured amplitude and extracting the square root of the squared measured amplitude.

16. The method of claim 1, wherein the data signal is used for the indicator signal.

17. The method of claim 16, wherein determining the strength of the indicator signal comprises measuring an amplitude of the indicator signal.

18. The method of claim 17, wherein determining the strength of the indicator signal further comprises squaring the measured amplitude.

19. The method of claim 1, wherein the data signal is an IF (Intermediate Frequency) signal in a low-IF transmitter or a low-IF transceiver.

20. The method of claim 1, wherein the correction signal is a dc signal.

21. The method of claim 1, further comprising performing the following steps once the value of the correction signal has been set to the optimum value:
  compensating for a second dc offset in a second data signal containing at least a second part of the information to be transmitted, using a second correction signal;

varying the second correction signal by making the second correction signal taking different values;

determining for each of the different values of the second correction signal a strength of a second indicator signal indicative of the second dc offset;

identifying, based upon the determined strengths of the second indicator signal, a second optimum value of the second correction signal at which the second dc offset is minimized; and setting the value of the second correction signal to the second optimum value.

22. The method of claim 21, further comprising complex mixing the data signal and the second data signal with a local oscillator signal and a second local oscillator signal, respectively, for generating a transmission signal to be transmitted through a wireless communication medium of the WLAN network;

wherein the local oscillator signal and the second local oscillator signal have a local oscillator frequency and a second local oscillator frequency, respectively, allowing for the transmission signal to have a first transmission signal component at a desired transmission frequency;

wherein the transmission signal further has a second transmission signal component and a third transmission signal component at the local oscillator frequency and at the second local oscillator frequency, respectively;

wherein the second transmission signal component is used for the indicator signal; and wherein the third transmission signal component is used for the second indicator signal.

23. The method of claim 22, wherein determining the strength of the indicator signal and/or determining the strength of the second indicator signal comprises measuring an amplitude of the indicator signal or of the second indicator signal, respectively.

24. The method of claim 23, wherein determining the strength of the indicator signal and/or determining the strength of the second indicator signal comprises calculating the absolute value of the measured amplitude of the indicator signal or of the second indicator signal, respectively.

25. The method of claim 24, wherein calculating the absolute value of the measured amplitude of the indicator signal and/or measuring the amplitude of the second indicator signal comprises squaring the measured amplitude of the indicator signal or of the second indicator signal, respectively, and extracting the square root of the squared measured amplitude of the indicator signal or of the second indicator signal, respectively.

26. The method of claim 22, wherein the local oscillator frequency equals the second local oscillator frequency;

wherein the second transmission signal component equals the third transmission signal component; and wherein the indicator signal equals the second indicator signal.

27. The method of claim 21, wherein the indicator signal equals the second indicator signal; and wherein the data signal and the second data signal are used for the indicator signal.

28. The method of claim 27, wherein determining the strength of the indicator signal comprises measuring an amplitude of the data signal and measuring an amplitude of the second data signal.

29. The method of claim 28, wherein determining the strength of the indicator signal further comprises squaring the measured amplitude of the data signal and squaring the measured amplitude of the second data signal.

30. The method of claim 29, wherein determining the strength of the indicator signal further comprises adding the squared amplitude of the data signal and the squared amplitude of the second data signal.

31. The method of claim 21, wherein the data signal is an IF (Intermediate Frequency) data signal and the second data signal is a second IF data signal in a low-IF transmitter or a low-IF transceiver.

32. The method of claim 21, wherein the data signal is an I (In-phase) data signal and the second data signal is a Q (Quadrature-phase) data signal.

33. The method of claim 21, wherein the data signal and the second data signal are cross-coupled signals.

34. The method of claim 33, further comprising generating the data signal using an input signal and the result of complex filtering a second input signal; and generating the second data signal using the second input signal and the result of complex filtering the input signal.

35. The method of claim 34, wherein the input signal is an IF (Intermediate Frequency) input signal and the second input signal is a second IF input signal in a low-IF transmitter or a low-IF transceiver.

36. The method of claim 34, wherein the input signal is an I (In-phase) input signal and the second input signal is a Q (Quadrature-phase) input signal.

37. The method of claim 21, wherein the data signal is kept switched on while the steps of compensating for the second dc offset, varying the second correction signal, determining the strength of the second indicator signal, identifying the second optimum value, and setting the value of the second correction signal are performed; and/or wherein the second data signal is kept switched on while the steps of compensating for the dc offset, varying the correction signal, determining the strength of the indicator signal, identifying the second optimum value, and setting the value of the correction signal are performed.

38. A method of transmitting information in a WLAN (Wireless Local Area Network) network wherein DC offsets are minimized, comprising:

applying a start value of a first correction signal to a first data signal containing at least a first part of the information to be transmitted;

applying a start value of a second correction signal to a second data signal containing at least a second part of the information to be transmitted;

tuning the first correction signal based upon a first indicator signal indicative of the first dc offset using a first feedback loop, wherein said tuning the first correction signal includes one of (1) repeatedly varying the first correction signal and determining the strength of the first indicator signal until a local extremum is detected, (2) comparing determined strengths of the first indicator signal with each other, (3) calculating first indicator signal strength differences, (4) interpolating determined strengths of the first indicator signal, and (5) calculating a derivative of determined strengths of the first indicator signal; and tuning the second correction signal based upon a second indicator signal indicative of the second dc offset using a second feedback loop, wherein said tuning the second correction signal includes one of (1) repeatedly varying the second correction signal and determining the strength of the second indicator signal until a local extremum is detected, (2) comparing determined strengths of the second indicator signal with each other, (3) calculating second indicator signal strength differences, (4) interpolating determined strengths of the second indicator signal, and (5) calculating a derivative of determined strengths of the second indicator signal.

39. The method of claim 38, wherein the first data signal and the second data signal are cross-coupled signals.

40. The method of claim 39, further comprising generating the first data signal using a first input signal and the result of complex filtering a second input signal; and
generating the second data signal using the second input signal and the result of complex filtering the first input signal.

41. The method of claim 38, wherein the first data signal is kept switched on while the steps of compensating for the second dc offset and tuning the second correction signal are performed; and/or
wherein the second data signal is kept switched on while the steps of compensating for the first dc offset and tuning the first correction signal are performed.

42. The method of claim 38, wherein tuning the first correction signal comprises:
varying the first correction signal by making the first correction signal taking different values;
determining for each of the different values of the first correction signal a strength of the first indicator signal;
identifying, based upon the determined strengths of the first indicator signal, a first optimum value of the first correction signal at which the first dc offset is minimized; and
setting the value of the first correction signal to the first optimum value.

43. The method of claim 38, wherein tuning the second correction signal comprises:
varying the second correction signal by making the second correction signal taking different values;
determining for each of the different values of the second correction signal a strength of the second indicator signal;
identifying, based upon the determined strengths of the second indicator signal, a second optimum value of the second correction signal at which the second dc offset is minimized; and
setting the value of the second correction signal to the second optimum value.

44. The method of claim 38, wherein tuning the first correction signal and tuning the second correction signal comprises:
varying the first correction signal and the second correction signal, respectively, by making the first correction signal and the second correction signal, respectively, taking different values;
determining for each of the different values of the first correction signal and of the second correction signal, respectively, a strength of the first indicator signal and of the second indicator signal, respectively;
identifying, based upon the determined strengths of the first indicator signal and of the second indicator signal, respectively, a first optimum value of the first correction signal and a second optimum value of the second correction signal, respectively, at which the first dc offset and the second dc offset, respectively, is minimized; and
setting the value of the first correction signal and of the second correction signal, respectively, to the first optimum value and to the second optimum value, respectively.

45. A WLAN (Wireless Local Area Network) communication device for transmitting information in a WLAN network wherein DC offsets are minimized, comprising:

a compensator unit arranged to apply a start value of a correction signal to a data signal containing at least part of the information to be transmitted;
a control unit arranged to vary the correction signal;
an analyzer unit arranged to determine for each different value of the correction signal, a strength of an indicator signal indicative of a dc offset; and
an identifier unit arranged to identify, based upon the determined strengths of the indicator signal, the optimum value of the correction signal at which the strength of the indicator signal is at a local extremum, wherein identifying the optimum values comprises one of (1) repeatedly varying the correction signal and determining the strength of the indicator signal until the local extremum is detected, (2) comparing determined strengths of the indicator signal with each other, (3) calculating indicator signal strength differences, (4) interpolating determined strengths of the indicator signal, and (5) calculating a derivative of determined strengths of the indicator signal.

46. The WLAN communication device of claim 45, wherein the strength of the indicator signal reaches a local minimum or a local maximum when the dc offset is minimized; and
wherein the WLAN communication device further comprises:
a detector unit arranged to detect whether the determined strengths comprise the local minimum or the local maximum, respectively; and
a selection unit arranged to select the value of the correction signal corresponding to the local minimum or the local maximum, respectively, as the optimum value.

47. The WLAN communication device of claim 46, arranged to repeatedly perform the following sequence of steps until the step of determining whether the determined strengths comprise the local minimum or the local maximum, respectively, yields that the determined strengths comprise the local minimum or the local maximum, respectively: varying, by the control unit, the correction signal by making the correction signal taking at least one further different value; determining, by the analyzer unit, the strength of the indicator signal for each of the further different values of the correction signal; and detecting, by the detector unit, whether the determined strengths determined for the different values and the at least one further different value of the correction signal comprise the local minimum or the local maximum, respectively.

48. The WLAN communication device of claim 45, wherein the control unit is further arranged to vary the correction signal by starting at a start value of the correction signal and stepwise increasing or decreasing the value of the correction signal by a step value until a target value is reached.

49. The WLAN communication device of claim 45, further comprising a mixer unit arranged to mix the data signal with a local oscillator signal generated by a local oscillator unit for generating a transmission signal to be transmitted through a wireless communication medium of the WLAN network;
wherein the local oscillator signal has a local oscillator frequency allowing for the transmission signal to have a first transmission signal component at a desired transmission frequency;
wherein the transmission signal further has a second transmission signal component at the local oscillator frequency; and
wherein the WLAN communication device is arranged to use the second transmission signal component for the indicator signal.

50. The WLAN communication device of claim 45, arranged to use the data signal for the indicator signal.

51. The WLAN communication device of claim 45, further comprising:
- a second compensator unit arranged to compensate for a second dc offset in a second data signal containing at least a second part of the information to be transmitted, using a second correction signal;
- a second control unit arranged to vary the second correction signal by making the second correction signal taking different values and to set the value of the second correction signal to a second optimum value at which the second dc offset is minimized;
- a second analyzer unit arranged to determine for each of the different values of the second correction signal a strength of a second indicator signal indicative of the second dc offset; and
- a second identifier unit arranged to identify, based upon the determined strengths of the second indicator signal, the second optimum value of the second correction signal.

52. A WLAN (Wireless Local Area Network) communication device for transmitting information in a WLAN network wherein DC offsets are minimized, comprising:
- a first compensator unit arranged to apply a start value of a first correction signal to a first data signal containing at least a first part of the information to be transmitted;
- a second compensator unit arranged to apply a start value of a second correction signal to a second data signal containing at least a second part of the information to be transmitted;
- a first feedback loop arranged to tune the first correction signal based upon a first indicator signal indicative of a first dc offset, wherein tuning the first correction signal includes one of (1) repeatedly varying the first correction signal and determining the strength of the first indicator signal until a local extremum is detected, (2) comparing determined strengths of the first indicator signal with each other, (3) calculating first indicator signal strength differences, (4) interpolating determined strengths of the first indicator signal, and (5) calculating a derivative of determined strengths of the first indicator signal; and
- a second feedback loop arranged to tune the second correction signal based upon a second indicator signal indicative of a second dc offset, wherein tuning the second correction signal includes one of (1) repeatedly varying the second correction signal and determining the strength of the second indicator signal until a local extremum is detected, (2) comparing determined strengths of the second indicator signal with each other, (3) calculating second indicator signal strength differences, (4) interpolating determined strengths of the second indicator signal, and (5) calculating a derivative of determined strengths of the second indicator signal.

53. The WLAN communication device of claim 52, arranged to perform the steps of compensating for the first dc offset in the first data signal, compensating for the second dc offset in the second data signal, tuning the first correction signal and tuning the second correction signal;
- wherein the first data signal and the second data signal are cross-coupled signals.

54. The WLAN communication device of claim 53, further comprising:
- a first complex filter arranged to complex filter a first input signal; and
- a second complex filter arranged to complex filter a second input signal;
- wherein the WLAN communication device is further arranged to generate the first data signal using the first input signal and the result of complex filtering the second input signal; and
- wherein the WLAN communication device is further arranged to generate the second data signal using the second input signal and the result of complex filtering the first input signal.

55. The WLAN communication device of claim 52, arranged to keep the first data signal switched on while performing the steps of compensating for the second dc offset and tuning the second correction signal; and/or
- wherein the WLAN communication device is further arranged to keep the second data signal switched on while performing the steps of compensating for the first dc offset and tuning the first correction signal.

56. The WLAN communication device of claim 52, wherein the first feedback loop comprises:
- a first control unit arranged to vary the first correction signal by making the first correction signal taking different values and to set the value of the first correction signal to a first optimum value at which the first dc offset is minimized;
- a first analyzer unit arranged to determine for each of the different values of the first correction signal a strength of the first indicator signal; and
- a first identifier unit arranged to identify, based upon the determined strengths of the first indicator signal, the first optimum value of the first correction signal.

57. The WLAN communication device of claim 52, wherein the second feedback loop comprises:
- a second control unit arranged to vary the second correction signal by making the second correction signal taking different values and to set the value of the second correction signal to a second optimum value at which the second dc offset is minimized;
- a second analyzer unit arranged to determine for each of the different values of the second correction signal a strength of the second indicator signal; and
- a second identifier unit arranged to identify, based upon the determined strengths of the second indicator signal, the second optimum value of the second correction signal.

58. An integrated circuit chip for transmitting information in a WLAN (Wireless Local Area Network) network wherein DC offsets are minimized, comprising:
- a compensator circuit arranged to apply a start value of a correction signal to a data signal containing at least part of the information to be transmitted;
- a control circuit arranged to vary the correction signal;
- an analyzer circuit arranged to determine for each different value of the correction signal a strength of an indicator signal indicative of a dc offset; and
- an identifier circuit arranged to identify, based upon the determined strengths of the indicator signal, the optimum value of the correction signal at which the strength of the indicator signal is at a local extremum, wherein identifying the optimum values comprises one of (1) repeatedly varying the correction signal and determining the strength of the indicator signal until the local extremum is detected, (2) comparing determined strengths of the indicator signal with each other, (3) calculating indicator signal strength differences, (4) interpolating determined strengths of the indicator signal, and (5) calculating a derivative of determined strengths of the indicator signal.

59. An integrated circuit chip for transmitting information in a WLAN (Wireless Local Area Network) network wherein DC offsets are minimized, comprising:
- a first compensator circuit arranged to apply a start value of a first correction signal to a first data signal containing at least a first part of the information to be transmitted;
- a second compensator circuit arranged to apply a start value of a second correction signal to a second data signal containing at least a second part of the information to be transmitted;
- a first feedback loop circuit arranged for tuning the first correction signal based upon a first indicator signal indicative of a first dc offset, wherein tuning the first correction signal includes one of (1) repeatedly varying the first correction signal and determining the strength of the first indicator signal until a local extremum is detected, (2) comparing determined strengths of the first indicator signal with each other, (3) calculating first indicator signal strength differences, (4) interpolating determined strengths of the first indicator signal, and (5) calculating a derivative of determined strengths of the first indicator signal; and
- a second feedback loop circuit for tuning the second correction signal based upon a second indicator signal indicative of a second dc offset, wherein tuning the second correction signal includes one of (1) repeatedly varying the second correction signal and determining the strength of the second indicator signal until a local extremum is detected, (2) comparing determined strengths of the second indicator signal with each other, (3) calculating second indicator signal strength differences, (4) interpolating determined strengths of the second indicator signal, and (5) calculating a derivative of determined strengths of the second indicator signal.

* * * * *